(12) United States Patent
Huang et al.

(10) Patent No.: US 8,825,122 B2
(45) Date of Patent: Sep. 2, 2014

(54) HAND-HELD DEIVCE

(75) Inventors: Che-Hung Huang, Taoyuan County (TW); Kuo-Ching Huang, Taoyuan County (TW); Chih-Ling Chien, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 113 days.

(21) Appl. No.: 13/239,359

(22) Filed: Sep. 21, 2011

(65) Prior Publication Data

US 2013/0070396 A1 Mar. 21, 2013

(51) Int. Cl.
*H05K 7/00* (2006.01)
*G06F 1/16* (2006.01)
*H05K 5/02* (2006.01)
*H04M 1/02* (2006.01)

(52) U.S. Cl.
CPC ........... *G06F 1/1624* (2013.01); *H04M 1/0239* (2013.01); *H04M 1/0237* (2013.01)
USPC .................. 455/575.4; 361/679.56; 455/348; 379/433.12

(58) Field of Classification Search
CPC .................................. H05K 7/00; H05K 5/02
USPC ....................................................... 455/575.4
See application file for complete search history.

(56) References Cited

U.S. PATENT DOCUMENTS

| 7,376,450 | B2 * | 5/2008 | Chen ......................... 455/575.4 |
| 7,818,038 | B2 | 10/2010 | Huang |
| 2008/0261659 | A1 * | 10/2008 | Jang et al. ..................... 455/566 |
| 2009/0211057 | A1 * | 8/2009 | Yamaguchi et al. ............ 16/362 |
| 2010/0029348 | A1 * | 2/2010 | Lee et al. ................... 455/575.4 |

* cited by examiner

*Primary Examiner* — Zachary M Pape
*Assistant Examiner* — Douglas Burtner
(74) *Attorney, Agent, or Firm* — Jianq Chyun IP Office

(57) ABSTRACT

A hand-held device includes a first body, a second body, a sliding module, and a guiding module. The sliding module is disposed between the first body and the second body, so that the second body is able to be slid on a two-dimensional plane relative to the first body. The guiding module includes a first guiding part and a second guiding part. The first guiding part is fixed to the first body. The second guiding part is fixed to the second body and coupled to the first guiding part. Besides, the second guiding part is able to be moved along a guiding path relative to the first guiding part, so that the second body is able to be slid along the guiding path on the two-dimensional plane relative to the first body.

8 Claims, 9 Drawing Sheets

HAND-HELD DEIVCE

BACKGROUND OF THE DISCLOSURE

1. Field of the Disclosure

The disclosure relates to a hand-held device. More particularly, the disclosure relates to a slide-type hand-held device.

2. Description of Related Art

A hand-held device refers to a device which can be held and operated by a user with his or her hand, such as a mobile phone, a multimedia player, a personal digital assistant (PDA), a pocket PC, a hand-held game console, a hand-held satellite navigator, and so on. The hand-held device usually has small size and light weight, so that the user can easily carry the hand-held device.

The early mobile phone, for instance, has a bar-type design. However, in order to achieve the portability of mobile phone but not to reduce the display screen size and the keypad area of the mobile phone, a folding-type mobile phone and a slide-type mobile phone have been developed.

In the slide-type hand-held device, two bodies of the device are overlapped and slid relative to each other, and hence the hand-held device can be folded and unfolded. However, in the existing slide-type hand-held devices, two bodies are slid relative to each other along a one-dimensional axis, which leads to monotonous use of the devices.

SUMMARY OF THE DISCLOSURE

The disclosure is directed to a hand-held device of which two bodies can be slid relative to each other along a guiding path on a two-dimensional plane, so as to fold or unfold the hand-held device.

In an embodiment of the disclosure, a hand-held device that includes a first body, a second body, a sliding module, and a guiding module is provided. The sliding module is disposed between the first body and the second body, so that the second body can be slid on a two-dimensional plane relative to the first body. The guiding module includes a first guiding part and a second guiding part. The first guiding part is fixed to the first body. The second guiding part is fixed to the second body and coupled to the first guiding part. Besides, the second guiding part is able to be moved relative to the first guiding part to a first position, a second position, a third position, and a fourth position, so that the second body can be slid along the guiding path on the two-dimensional plane relative to the first body.

Based on the above, the second body of the hand-held device can be slid relative to the first body along the guiding path on the two-dimensional plane, so as to fold or unfold the hand-held device. Hence, the hand-held device allows a user to fold or unfold the hand-held device in a manner different from the conventional sliding motion along a one-dimensional axis.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EXEMPLARY EMBODIMENTS

Figure 1A:
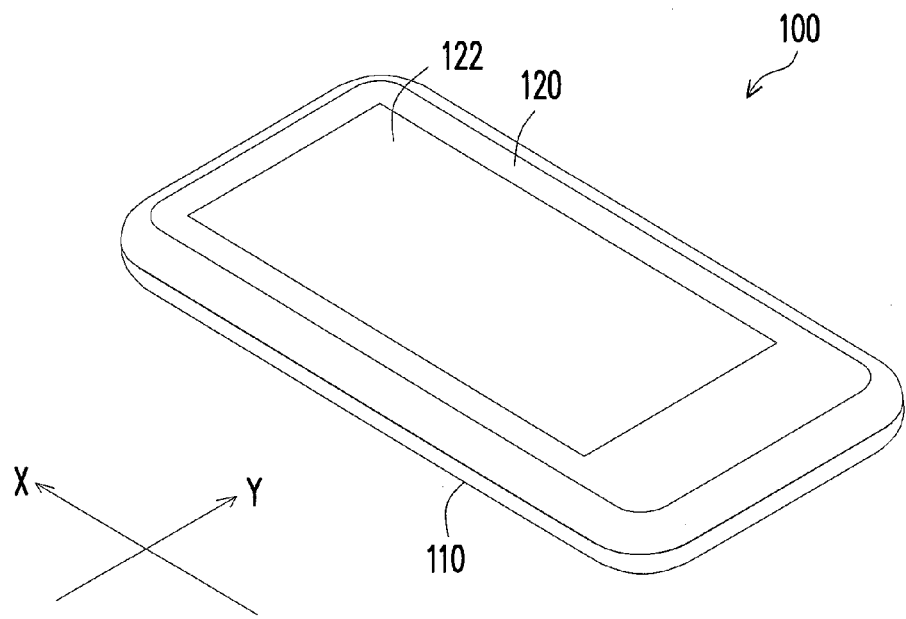
FIG. 1A to FIG. 1D are top perspective views illustrating a hand-held device with different appearances according to an embodiment of the disclosure.

FIG. 1A to FIG. 1D are top perspective views illustrating a hand-held device with different appearances according to an embodiment of the disclosure. With reference to FIG. 1A, the hand-held device 100 described in this embodiment includes a first body 110 and a second body 120. The first body 110 has a keypad module 112, and the second body 120 has a display screen 122. In FIG. 1A, the hand-held device 100 is in a folded state, the second body 120 and the first body 110 are overlapped, and the second body 120 covers the keypad module 112.

Figure 1B:
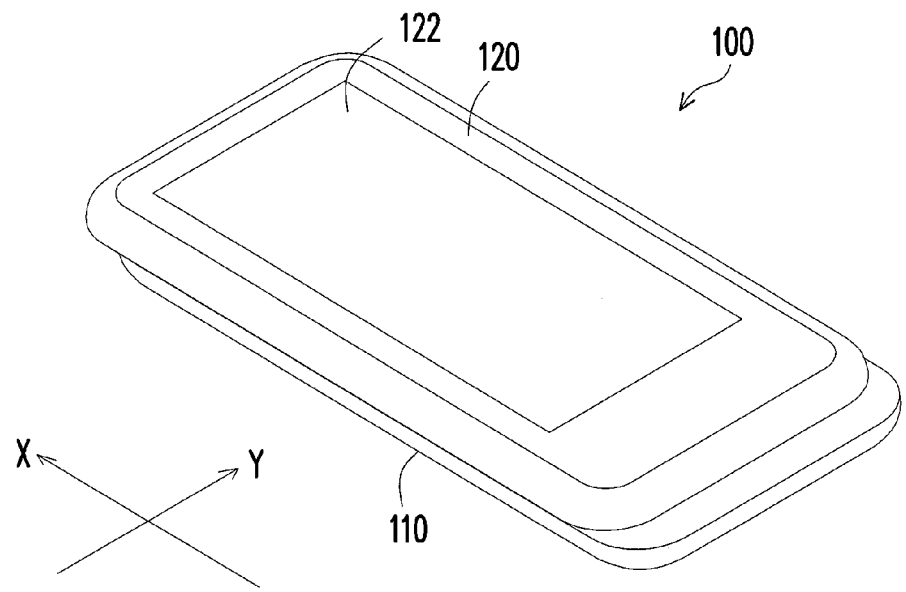
Figure 1C:
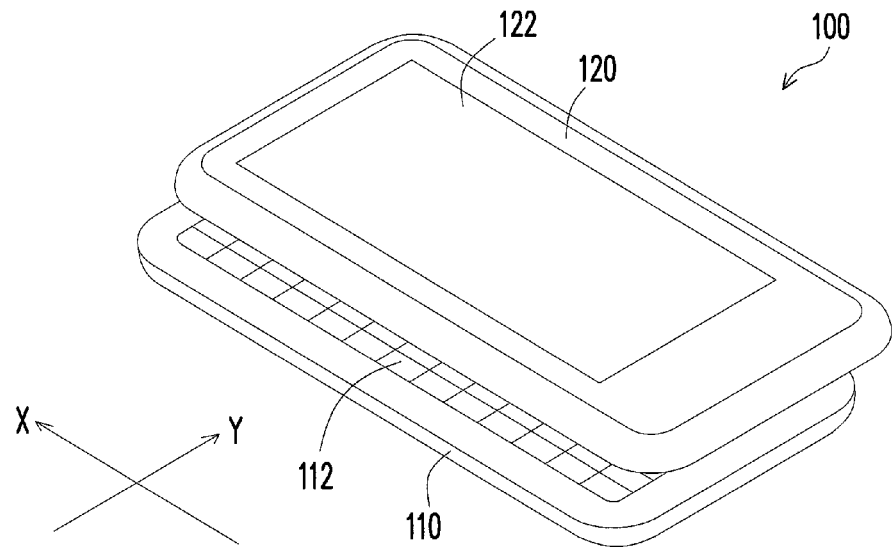
Figure 1D:
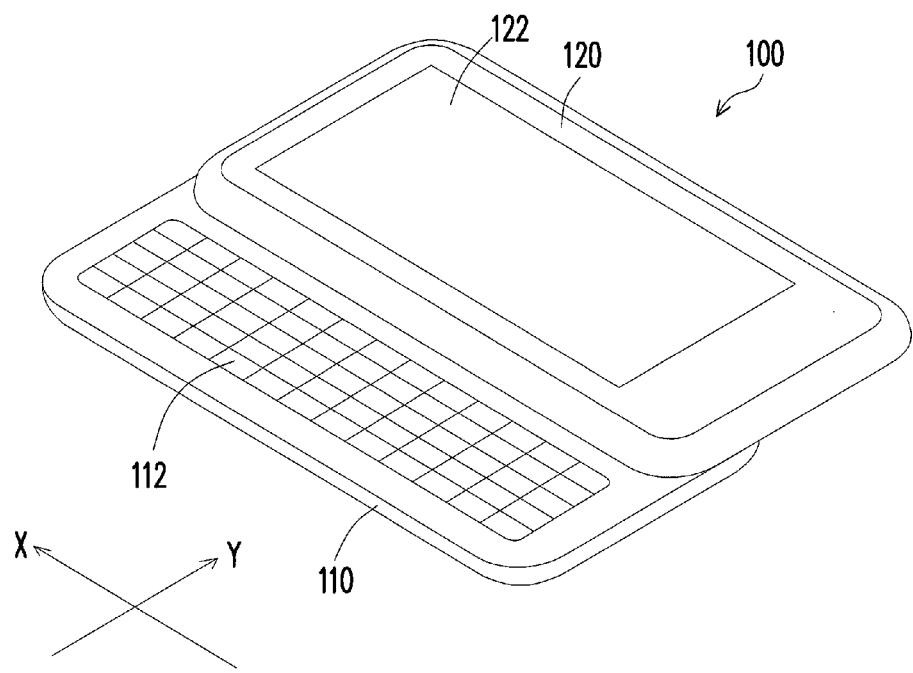

When the hand-held device 100 is to be unfolded, the second body 120 of the hand-held device 100 is moved relative to the first body 110 from the position shown in FIG. 1A to the position shown in FIG. 1B, and the second body 120 is moved relative to the first body 110 to the position shown in FIG. 1C and then to the position shown in FIG. 1D. Thereby, the hand-held device 100 is completely unfolded. When the hand-held device 100 is unfolded and is in the state shown in FIG. 1D, a user is able to use the keypad module 112 and the display screen 122 at the same time.

In the process of folding and unfolding the hand-held device 100, as described in this embodiment, the second body 120 can be slid on a two-dimensional plane (X-Y plane) relative to the first body 110. A length direction of the display screen 122 is parallel to one one-dimensional axis (X axis) of the two-dimensional plane, and a width direction of the display screen 122 is parallel to the other one-dimensional axis (Y axis) of the two-dimensional plane.

Figure 2:
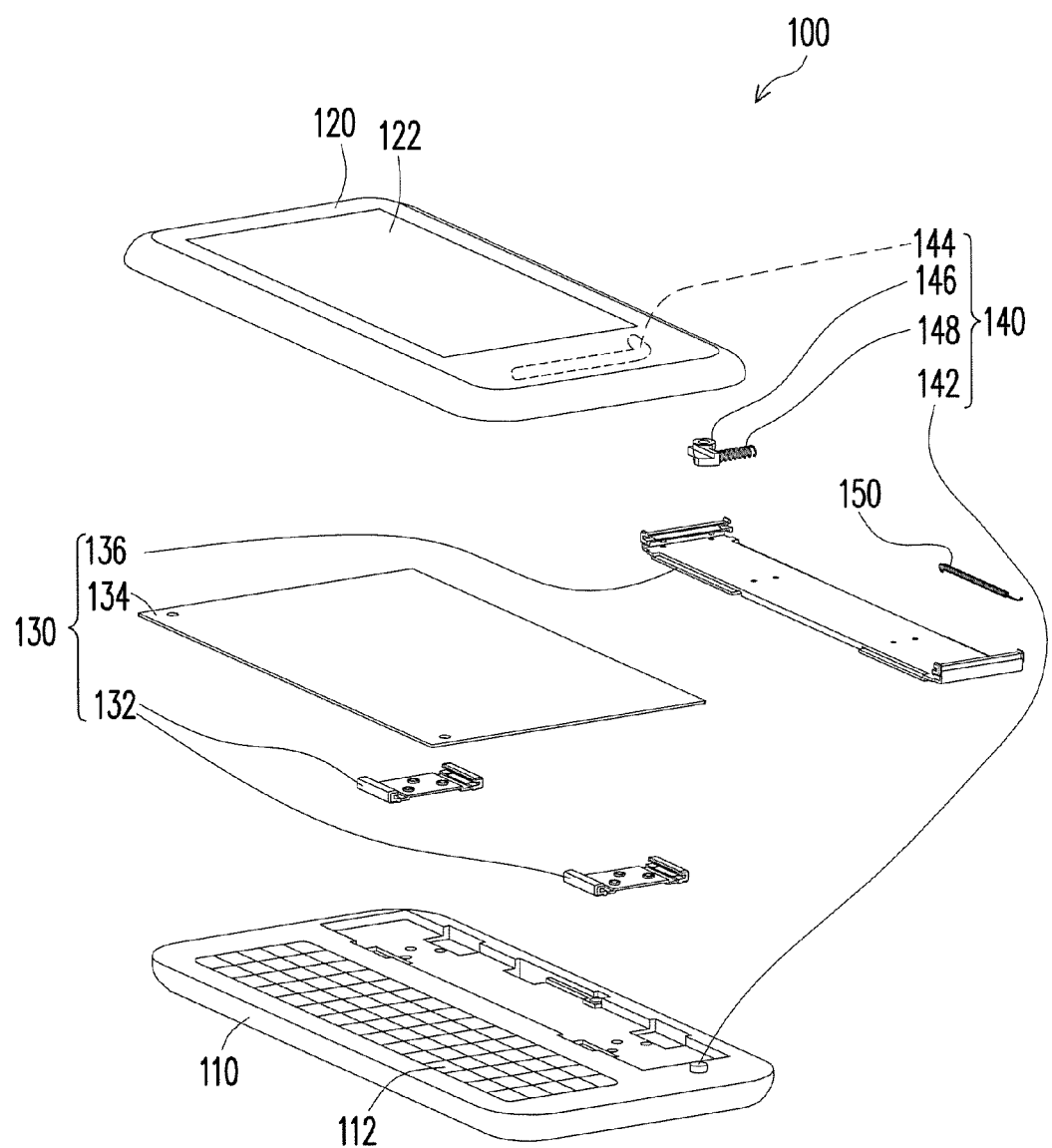
FIG. 2 is an exploded view illustrating the hand-held device depicted in FIG. 1A.

FIG. 2 is an exploded view illustrating the hand-held device depicted in FIG. 1A. In this embodiment, the hand-held device 100 further includes a sliding module 130, a guiding module 140, and a reposition member 150.

The sliding module 130 is disposed between the first body 110 and the second body 120, so that the second body 120 can be slid on a two-dimensional plane (X-Y plane) relative to the first body 110. The sliding module 130 includes a first sliding bracket 132, a second sliding bracket 134, and a third sliding bracket 136. The first sliding bracket 132 is fixed to the first body 110. The second sliding bracket 134 is fixed to the second body 120. The third sliding bracket 136 is slidably disposed on the first sliding bracket 132 along one one-dimensional axis (X-axis) of the two-dimensional plane (X-Y plane) and slidably disposed on the second sliding bracket 134 along the other one-dimensional axis (Y-axis) of the two-dimensional plane.

The guiding module 140 includes a first guiding part 142 and a second guiding part 144. The first guiding part 142 is fixed to the first body 110. The second guiding part 144 is fixed to the second body 120 and coupled to the first guiding part 142. The second guiding part 144 can be moved along a guiding path relative to the first guiding part 142, so that the second body 120 can be slid along the guiding path on the two-dimensional plane (X-Y plane) relative to the first body 110. In this embodiment, the first guiding part 142 can be a sliding block, and the second guiding part 144 can be a sliding groove.

Additionally, the guiding module 140 further includes a stopper 146 and an elastic member 148. The stopper 146 is movably (e.g., pivotally) connected to the second body 120, and the elastic member 148 is disposed between the second body 120 and the stopper 146. When the elastic member 148 is in an initial state, the stopper 146 is partially located in the second guiding part 144, so as to interfere with the movement of the first guiding part 142 relative to the second guiding part 144.

The reposition member 150 may be disposed between one of the first body 110, the first sliding bracket 132, and the first guiding part 142 and one of the second body 120 and the second sliding bracket 134. In the present embodiment, the reposition member 150 is a tensile spring. When the reposition member 150 has the potential energy, and the second body 120 is not restrained from moving relative to the first body 110, the reposition member 150 allows the second body 120 to be moved relative to the first body 110.

FIG. 3A to FIG. 3D are bottom perspective views illustrating the hand-held device depicted in FIG. 1A to FIG. 1D with different appearances after the first body is removed. In FIG. 3A to FIG. 3D, the second guiding part 144 relative to the first guiding part 142 is respectively located at a first position P1, a second position P2, a third position P3, and a fourth position P4. To clearly describe the position relation between the first and second guiding parts 142 and 144, the first body 110 of the hand-held device 100 is intentionally hidden in FIG. 3A to FIG. 3D.

Figure 3A:
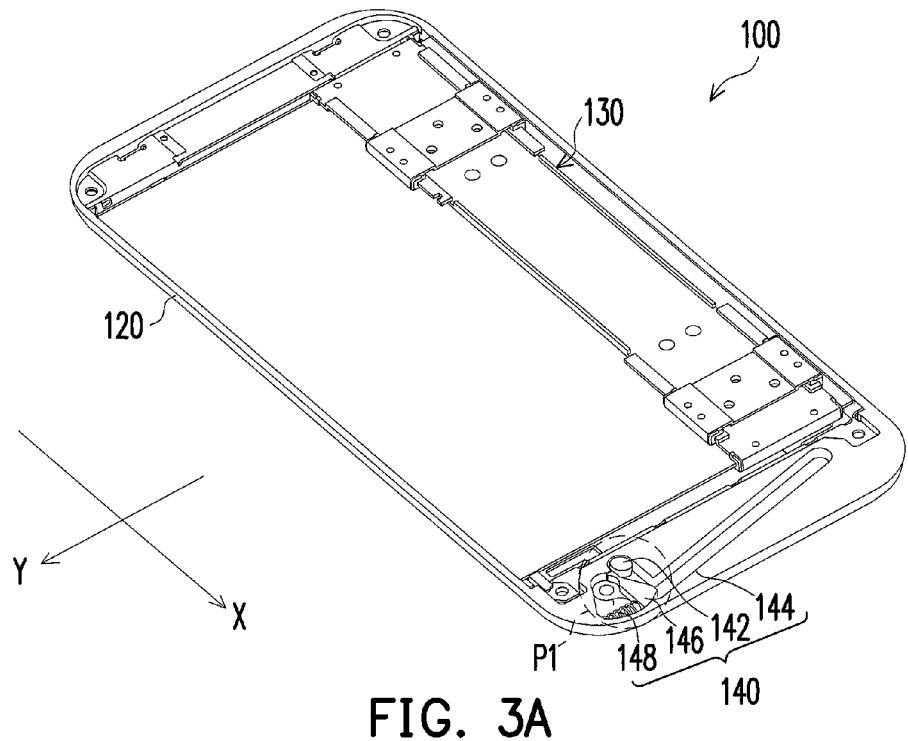
FIG. 3A to FIG. 3D are bottom perspective views illustrating the hand-held device depicted in FIG. 1A to FIG. 1D with different appearances after the first body is removed.
Figure 3B:
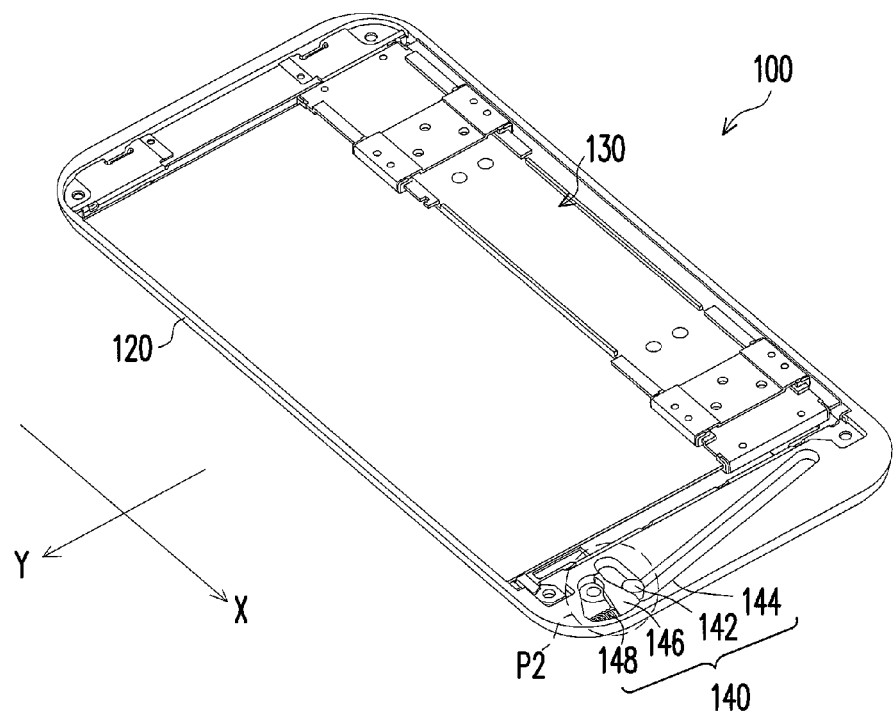
Figure 3C:
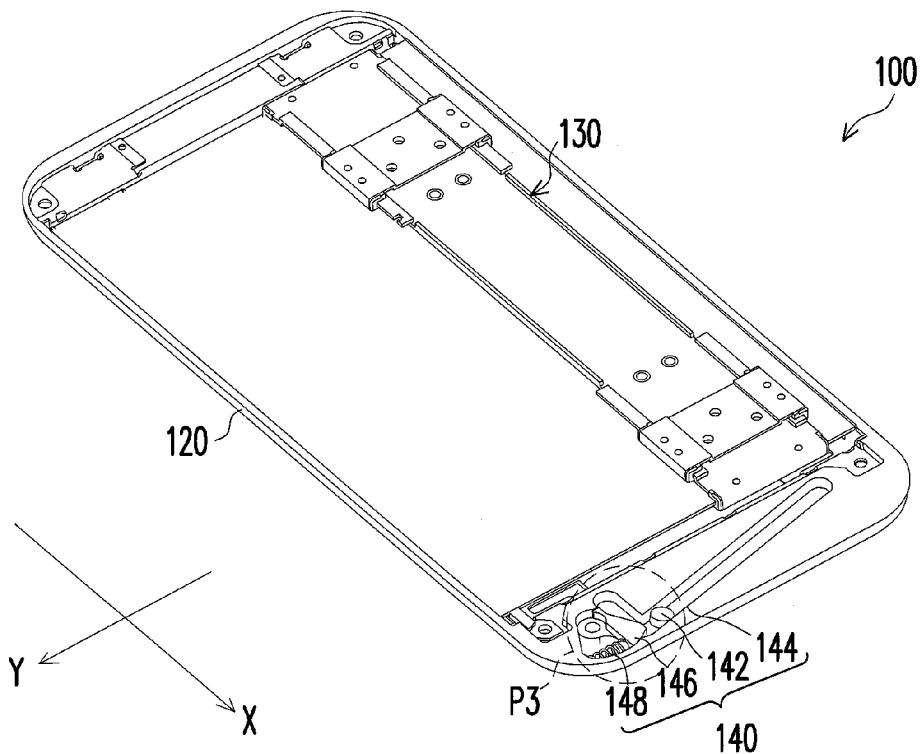
Figure 3D:
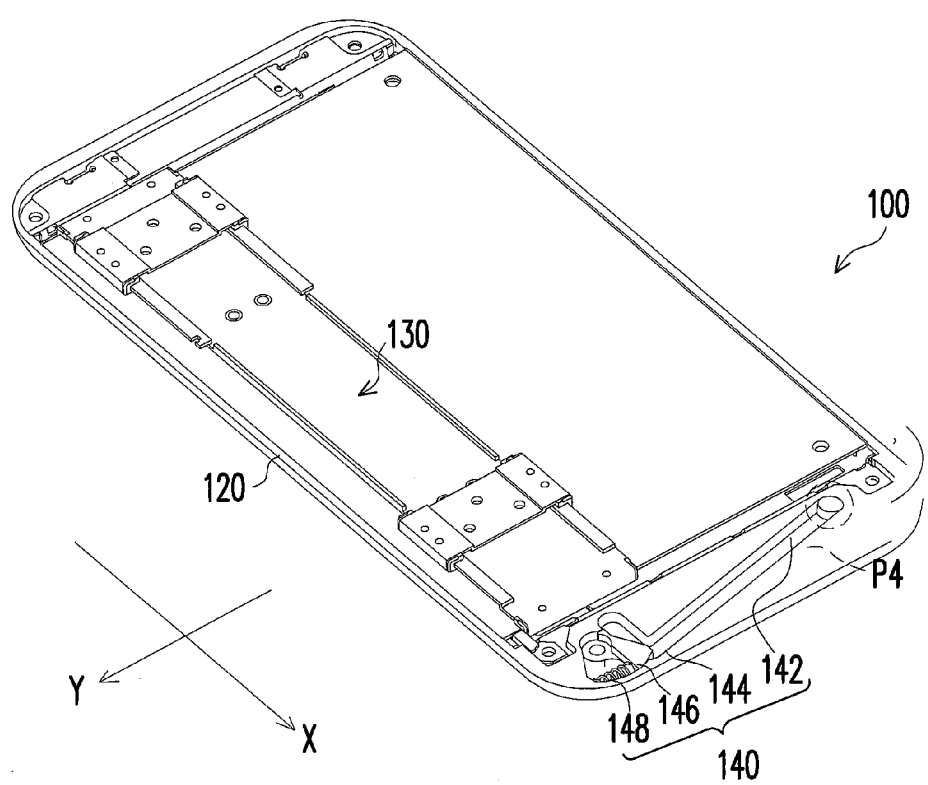

In the hand-held device 100 of this embodiment, the reposition member 150 moves the second guiding part 144 relative to the first guiding part 142 from the third position P3 shown in FIG. 3C to the fourth position P4 shown in FIG. 3D or from the second position P2 shown in FIG. 3B to the first position P1 shown in FIG. 3A.

When the hand-held device 100 is in the folded state as shown in FIG. 3A, the second guiding part 144 is located at the first position P1 relative to the first guiding part 142, as indicated in FIG. 3A. At this time, the elastic member 148 is not compressed. If the hand-held device 100 is to be unfolded, a force can be applied, so that the second body 120 is slid relative to the first body 110. Thereby, the second guiding part 144 is forced by an external force to move relative to the first guiding part 142 from the first position P1 shown in FIG. 3A to the second position P2 shown in FIG. 3B, the first guiding part 142 pushes the stopper 146 to press the elastic member 148, and the stopper 146 is ejected from the second guiding part 144. When the external force is removed, the elastic member 148 pushes the stopper 146 and the first guiding part 142, so as to move the second guiding part 144 relative to the first guiding part 142 from the second position P2 shown in FIG. 3B to the third position P3 shown in FIG. 3C. When the second guiding part 144 is located at the third position P3 relative to the first guiding part 142, the reposition member 150 moves the second guiding part 144 relative to the first guiding part 142 from the third position P3 shown in FIG. 3C to the fourth position P4 shown in FIG. 3D, so as to unfold the hand-held device 100.

When the hand-held device 100 in the unfolded state (shown in FIG. 3D) is to be folded (shown in FIG. 3A), a force can be applied, so that the second body 120 is slid relative to the first body 110. Thereby, the second guiding part 144 is forced by an external force to move relative to the first guiding part 142 from the fourth position P4 shown in FIG. 3D to the third position P3 shown in FIG. 3C along the guiding path, the first guiding part 142 pushes the stopper 146, and the stopper 146 is slid to the second position P2 shown in FIG. 3B. When the second guiding part 144 is located at the second position P2 relative to the first guiding part 142, as shown in FIG. 3B, and the force is removed, the reposition member 150 moves the second guiding part 144 relative to the first guiding part 142 from the second position P2 to the first position P1 shown in FIG. 3A, so as to fold the hand-held device 100.

According to this embodiment, a track along which the second guiding part 144 is moved relative to the first guiding part 142 between the first position P1 shown in FIG. 3A and the second position P2 shown in FIG. 3B may be parallel to one one-dimensional axis (X-axis) of the two-dimensional plane (X-Y plane), and a track along which the second guiding part 144 is moved relative to the first guiding part 142 between the first position P1 shown in FIG. 3A and the fourth position P4 shown in FIG. 3D may be parallel to the other one-dimensional axis (Y-axis) of the two-dimensional plane (X-Y plane).

Figure 4A:
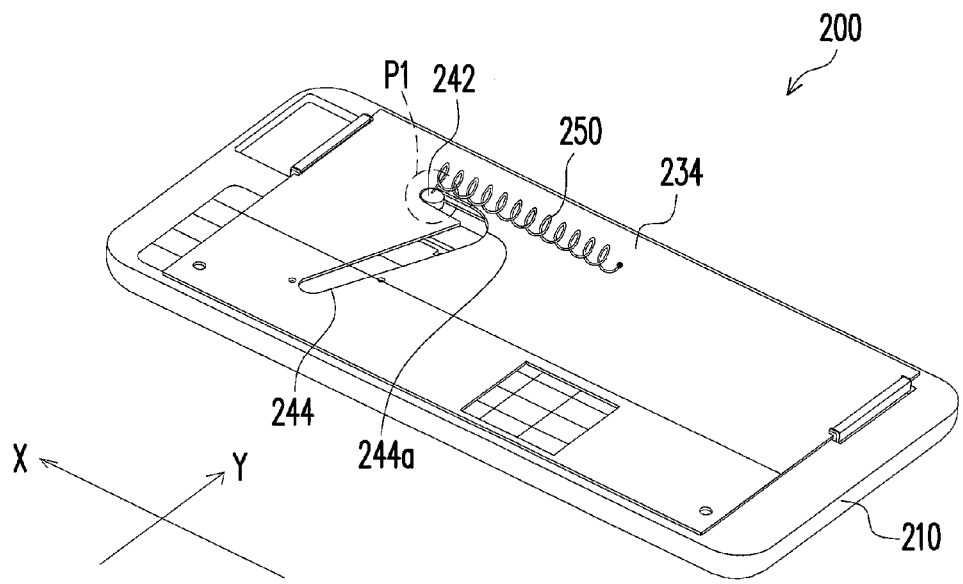
FIG. 4A to FIG. 4D are top perspective views illustrating a hand-held device with different appearances according to another embodiment of the disclosure.
Figure 4B:
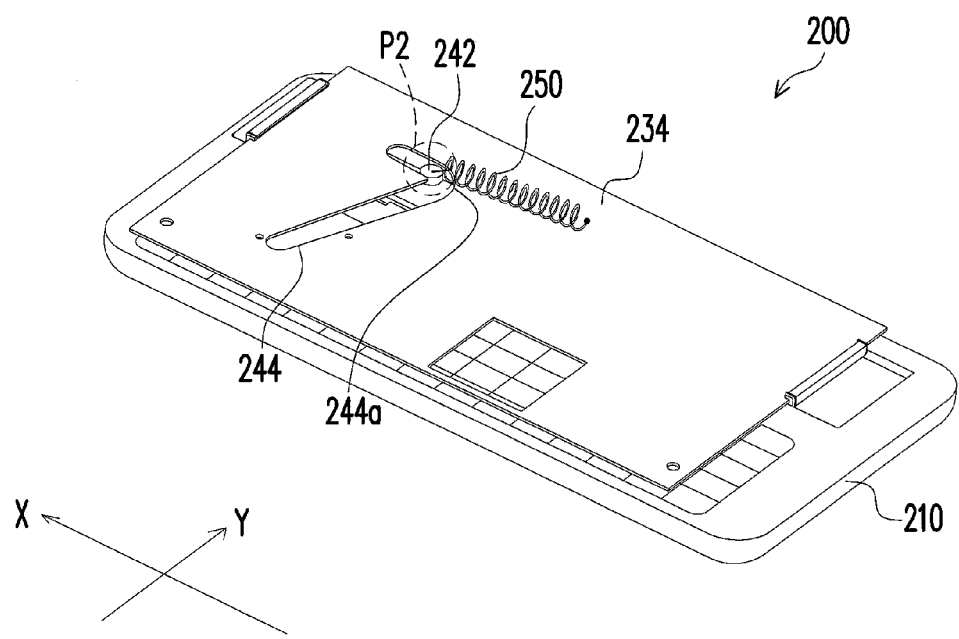
Figure 4C:
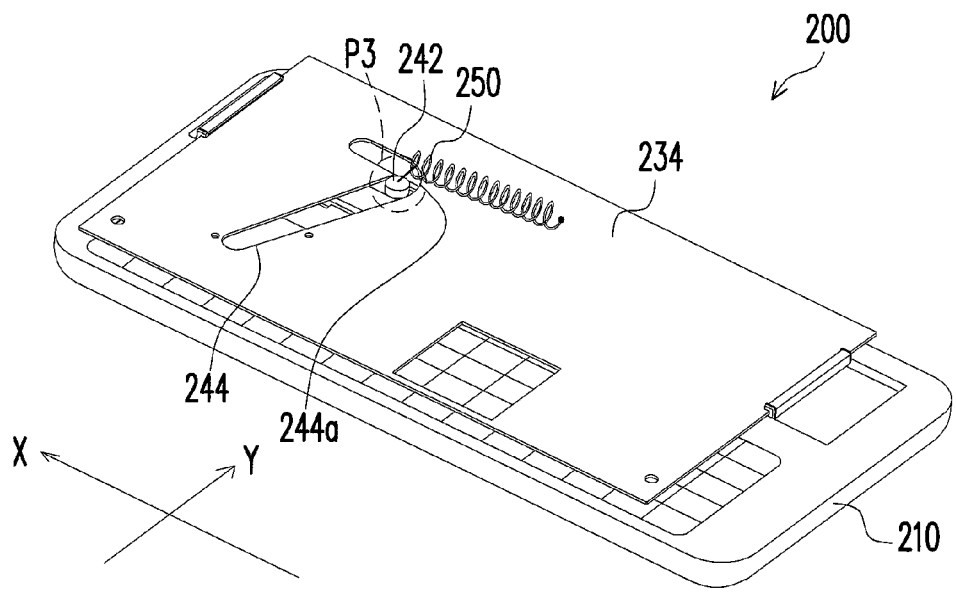
Figure 4D:
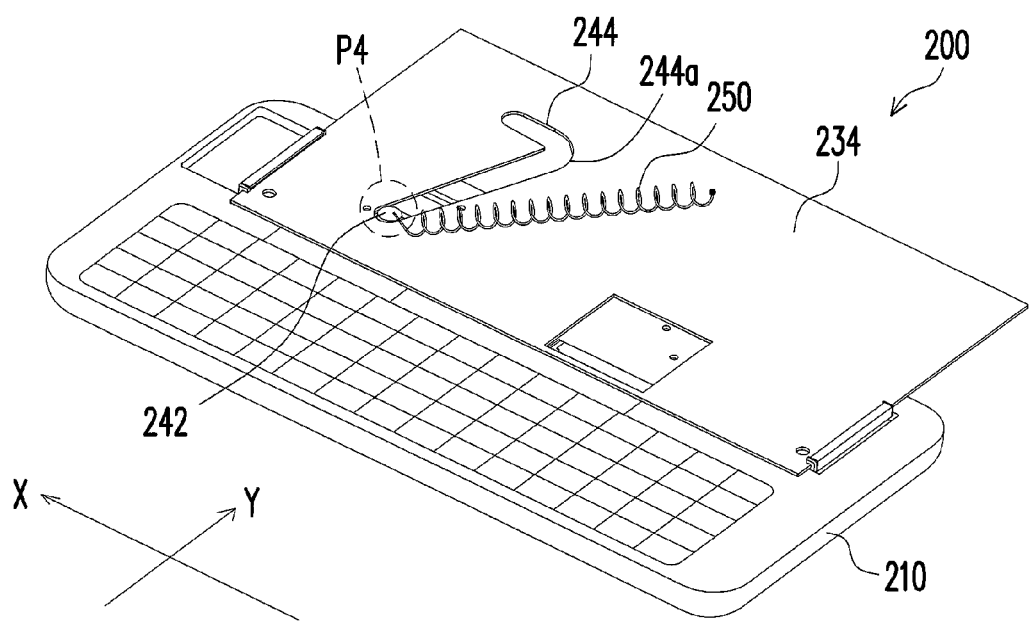
Figure 5A:
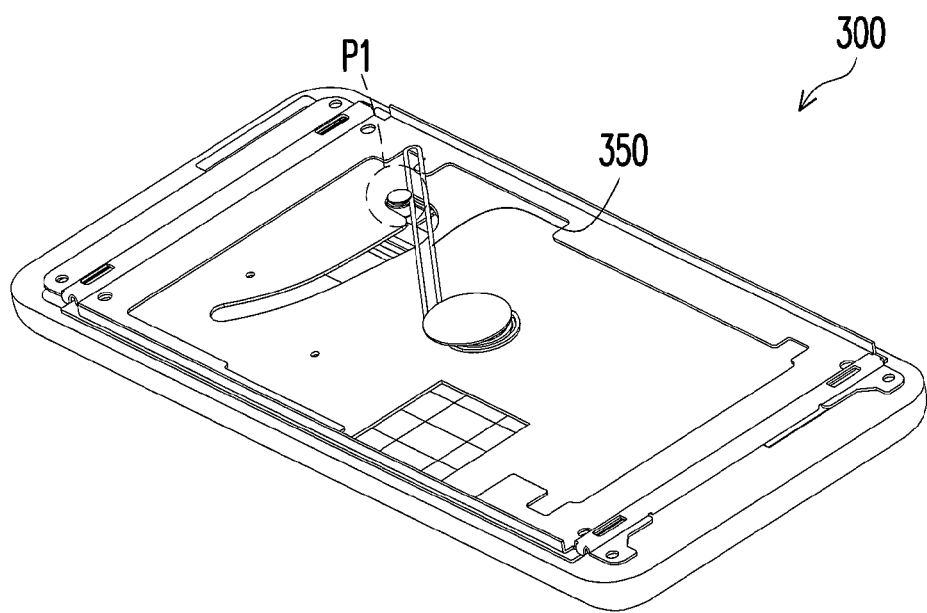
FIG. 5A to FIG. 5D are top perspective views illustrating a hand-held device with different appearances according to still another embodiment of the disclosure.
Figure 5B:
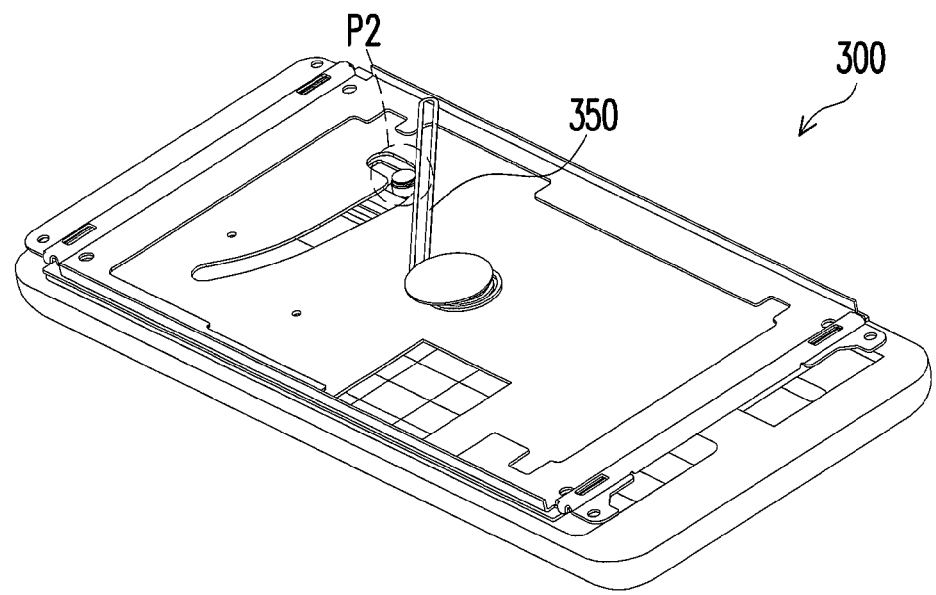
Figure 5C:
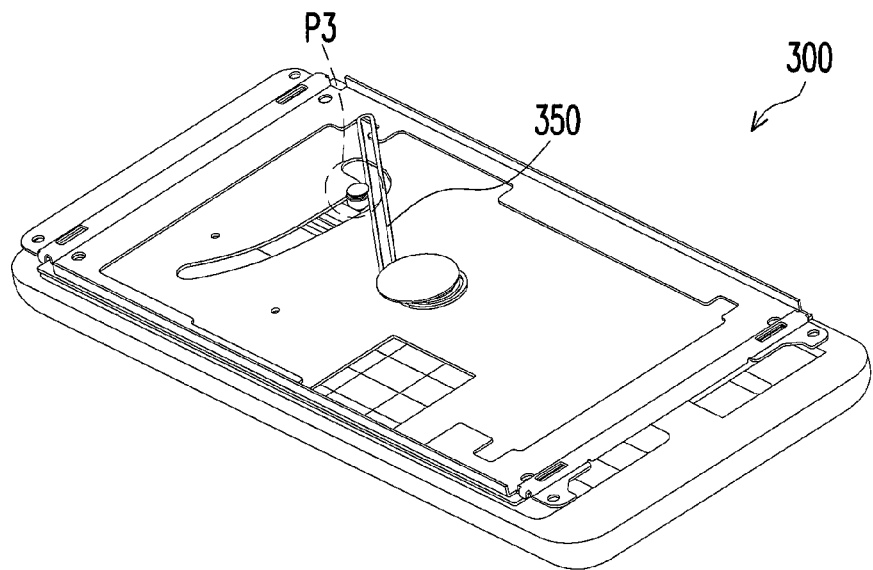
Figure 5D:
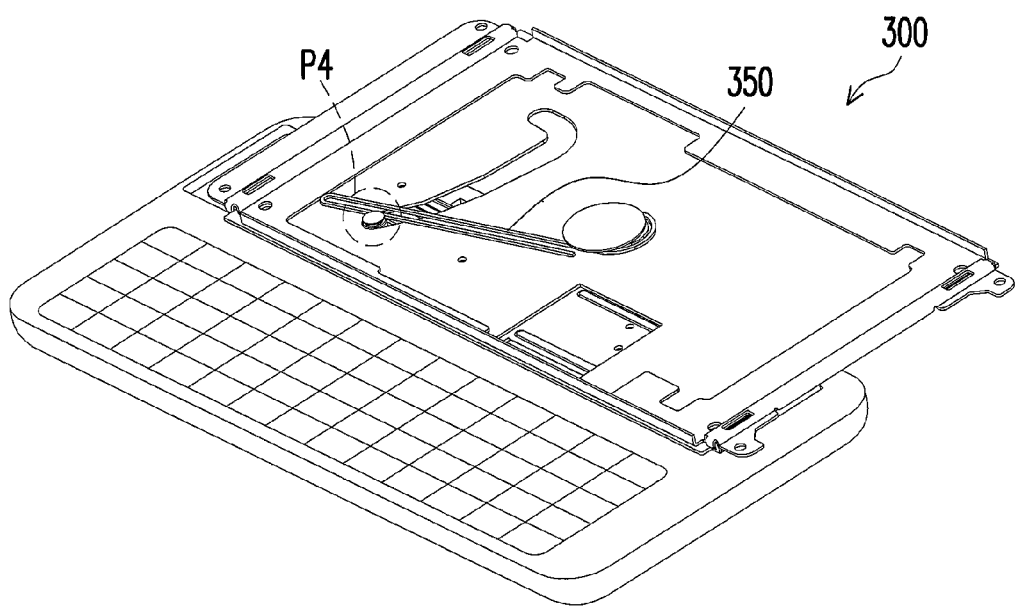

FIG. 4A to FIG. 4D are top perspective views illustrating a hand-held device with different appearances according to another embodiment of the disclosure. With reference to FIG. 4A, the hand-held device 200 described in this embodiment includes a first guiding part 242 and a second guiding part 244. The first guiding part 242 is fixed to a first body 210. The second guiding part 244 is fixed to a second sliding bracket 234 and coupled to the first guiding part 242. Besides, the second guiding part 244 has an arc surface 244a. The second sliding bracket 234 slides on a two-dimensional plane relative to the first body 210. In this embodiment, the second body disposed on the second sliding bracket 234 is intentionally hidden to clearly describe how the second guiding part 244 is moved relative to the first guiding part 242 along the guiding path to a first position P1 shown in FIG. 4A, a second position P2 shown in FIG. 4B, a third position P3 shown in FIG. 4C, and a fourth position P4 shown in FIG. 4D.

In the present embodiment, the reposition member 250 is a tensile spring. Besides, the reposition member 250 is disposed between the first guiding part 242 and the second sliding bracket 234 and can move the second guiding part 244 relative to the first guiding part 242 from the third position P3 shown in FIG. 4C to the fourth position P4 shown in FIG. 4D or from the second position P2 shown in FIG. 4B to the first position P1 shown in FIG. 4A. Certainly, if the second body (not shown) is disposed on the second sliding bracket 234, the reposition member 250 can also be disposed between the first guiding part 242 and the second body.

When the hand-held device 200 is in the folded state as shown in FIG. 4A, the second guiding part 244 is located at the first position P1 relative to the first guiding part 242, as indicated in FIG. 4A. If the hand-held device 200 is to be unfolded, a force can be applied, so that the second body 220 is slid relative to the first body 210. Thereby, the second guiding part 244 is forced to move relative to the first guiding part 242 along the guiding path to the second position P2 shown in FIG. 4B. When the second guiding part 244 is moved relative to the first guiding part 242 to the second position P2 shown in FIG. 4B, the design of the arc surface 244a of the second guiding part 244 allows the first guiding part 242 to be slid along the arc surface 244a of the second guiding part 244, so that the second guiding part 244 is moved relative to the first guiding part 242 from the second position P2 shown in FIG. 4B to the third position P3 shown in FIG.

4C. When the second guiding part 244 is located at the third position P3 (shown in FIG. 4C) relative to the first guiding part 242, the reposition member 250 moves the second guiding part 244 relative to the first guiding part 242 from the third position P3 shown in FIG. 4C to the fourth position P4 shown in FIG. 4D, so as to unfold the hand-held device 200.

When the hand-held device 200 in the unfolded state (shown in FIG. 4D) is to be folded (shown in FIG. 4A), a force can be applied, so that the second body 220 is slid relative to the first body 210. Thereby, the second guiding part 244 is forced by an external force to move relative to the first guiding part 242 from the fourth position P4 shown in FIG. 4D to the third position P3 shown in FIG. 4C along the guiding path. The second guiding part 244 having the arc surface 244a can then be slid relative to the first guiding part 242 to the second position P2 shown in FIG. 4B. When the second guiding part 244 is located at the second position P2 (shown in FIG. 4B) relative to the first guiding part 242, and the force is removed, the reposition member 250 moves the second guiding part 244 relative to the first guiding part 242 from the second position P2 shown in FIG. 4B to the first position P1 shown in FIG. 4A, so as to fold the hand-held device 200.

In the embodiment depicted in FIG. 3A, the stopper 146 and the elastic member 148 allow the second guiding part 144 to be moved relative to the first guiding part 142 from the second position P2 shown in FIG. 3B to the third position P3 shown in FIG. 3C. Unlike the embodiment depicted in FIG. 3A, the embodiment depicted in FIG. 4A indicates that the arc surface 244a of the second guiding part 244 allows the second guiding part 244 to be moved relative to the first guiding part 242 from the second position P2 shown in FIG. 4B to the third position P3 shown in FIG. 4C.

FIG. 5A to FIG. 5D are top perspective views illustrating a hand-held device with different appearances according to still another embodiment of the disclosure. As indicated in FIG. 5A to FIG. 5D, the reposition member 350 in the hand-held device 300 of this embodiment, in comparison with the embodiment shown in FIG. 4A, is a torsion spring. Certainly, the types of the reposition members are not limited to those described in the previous embodiments.

In light of the foregoing, due to the sliding module and the guiding module in the hand-held device of the disclosure, the second body of the hand-held device can be slid relative to the first body along the guiding path on the two-dimensional plane. Thereby, the hand-held device allows a user to have more options to fold or unfold of the hand-held device in a manner different from the conventional sliding motion along a one-dimensional axis. Moreover, in case that the hand-held device of the disclosure has the reposition member, the reposition member allows the second body to be moved relative to the first body to the first position or the fourth position, so as to spontaneously fold or unfold the hand-held device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A hand-held device comprising: a first body; a second body; a sliding module disposed between the first body and the second body, so that the second body is able to be slid on a two-dimensional plane relative to the first body; and a guiding module comprising: a first guiding part fixed to the first body; a second guiding part fixed to the second body and coupled to the first guiding part, wherein the second guiding part is able to be moved along a guiding path to a first position, a second position, a third position, and a fourth position, so that the second body is able to be slid along the guiding path on the two-dimensional plane relative to the first body, wherein the sliding module comprises: a first sliding bracket fixed to the first body; a second sliding bracket fixed to the second body; and a third sliding bracket slidably disposed on the first sliding bracket along one one-dimensional axis of the two-dimensional plane and slidably disposed on the second sliding bracket along the other one-dimensional axis of the two-dimensional plane, wherein a track along which the second guiding part is moved relative to the first guiding part between the first position and the second position is only parallel to one one-dimensional axis of the two-dimensional plane, and a connecting line between the first position and the fourth position is parallel to the other one-dimensional axis of the two-dimensional plane; wherein the first position corresponds to a closed position, and the fourth position corresponds to an open position.

2. The hand-held device as recited in claim 1 further comprising: a reposition member disposed between the first body and the second body, the reposition member being able to move the second guiding part relative to the first guiding part from the third position to the fourth position or from the second position to the first position.

3. The hand-held device as recited in claim 1, wherein a reposition member is disposed between one of the first body, the first sliding bracket, and the first guiding part and one of the second body and the second sliding bracket.

4. The hand-held device as recited in claim 1, wherein the first guiding part is a sliding block, and the second guiding part is a sliding groove.

5. The hand-held device as recited in claim 1, wherein the first guiding part is a sliding block, the second guiding part is a sliding groove, and the guiding module further comprises: a stopper movably connected to the second body; and an elastic member disposed between the second body and the stopper, wherein when the second guiding part is forced by an external force to move relative to the first guiding part from the first position to the second position, the first guiding part pushes the stopper to press the elastic member, and when the external force is removed, the elastic member pushes the stopper to press the first guiding part, so as to move the second guiding part relative to the first guiding part from the second position to the third position.

6. The hand-held device as recited in claim 2, wherein the first guiding part is a sliding block, the second guiding part is a sliding groove, and the second guiding part has an arc surface, so that the second guiding part is able to be moved relative to the first guiding part from the second position to the third position through the arc surface.

7. The hand-held device as recited in claim 6, wherein the reposition member is disposed between the sliding block and one of the second body and the second sliding bracket.

8. The hand-held device as recited in claim 1, wherein a length direction of the second body is parallel to one one-dimensional axis of the two-dimensional plane, and a width direction of the second body is parallel to the other one-dimensional axis of the two-dimensional plane.

* * * * *